United States Patent
Patrawala et al.

(10) Patent No.: US 9,558,293 B2
(45) Date of Patent: *Jan. 31, 2017

(54) SYSTEMS, COMPUTER PROGRAM PRODUCTS, AND METHODS FOR GENERATING CUSTOM WEB PAGES FOR MOBILE DEVICES

(71) Applicant: AT&T Intellectual Property I, L.P., Atlanta, GA (US)

(72) Inventors: Zakir Patrawala, Atlanta, GA (US); Samira Virani, Johns Creek, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/565,554

(22) Filed: Dec. 10, 2014

(65) Prior Publication Data

US 2015/0095766 A1 Apr. 2, 2015

Related U.S. Application Data

(63) Continuation of application No. 13/792,588, filed on Mar. 11, 2013, now Pat. No. 8,949,322, which is a (Continued)

(51) Int. Cl.
*G06F 15/16* (2006.01)
*G06F 17/30* (2006.01)
(Continued)

(52) U.S. Cl.
CPC ..... *G06F 17/30905* (2013.01); *G06F 17/2247* (2013.01); *G06F 17/3089* (2013.01); *H04L 29/06047* (2013.01)

(58) Field of Classification Search
CPC .... G06F 17/30905; H04L 29/06; H04L 67/02; H04N 21/2343; H04N 21/2351; H04N 21/47202; H04N 21/8358; H04N 7/01
(Continued)

(56) References Cited

U.S. PATENT DOCUMENTS 6,300,947 B1 10/2001 Kanevsky
7,627,648 B1 12/2009 Mehta et al.
(Continued)

OTHER PUBLICATIONS

State of Art the in Re(verse) Engineering and Transcoding of UI's, UCL Belgian Laboratory of Computer-Human Interaction, p. 21 (Jul. 14, 2002).
(Continued)

*Primary Examiner* — Ruolei Zong
(74) *Attorney, Agent, or Firm* — Hartman & Citrin LLC (57) ABSTRACT

A system generating a web page portal customized for a particular requesting mobile device is disclosed. The system includes an information store having multiple groups, each associated with device qualifications, web-design characteristics, and device identifications. The system also includes a custom web page development database (CWDD) including a plurality of web page component modules storing forms of web page components, and a custom web page development server (CWDS). The CWDS (i) receives an incoming request for a web page from the particular requesting mobile device, (ii) identifies a device type, and (iii) determines an applicable group. The CWDS also (iv) obtains web-design characteristics from the applicable group, (v) accesses the CWDD and obtains applicable web page components based on the web-design characteristics obtained from the applicable group of the information store, and (vi) generates the custom web page portal using the applicable web page components obtained from the CWDD.

12 Claims, 7 Drawing Sheets

Related U.S. Application Data continuation of application No. 12/806,761, filed on Aug. 19, 2010, now Pat. No. 8,438,219.

(51) Int. Cl.
  *H04L 29/06* (2006.01)
  *G06F 17/22* (2006.01)

(58) Field of Classification Search
  USPC ......... 709/203, 217–219, 226; 715/517, 525, 715/700–866
  See application file for complete search history.

(56) References Cited

U.S. PATENT DOCUMENTS

| | | |
|---|---|---|
| 2003/0101203 A1 | 5/2003 | Chen et al. |
| 2004/0049574 A1* | 3/2004 | Watson ............. G06F 17/30905 709/224 |
| 2005/0197157 A1 | 9/2005 | Li et al. |
| 2007/0083810 A1 | 4/2007 | Scott et al. |
| 2008/0139191 A1 | 6/2008 | Meinyk et al. |
| 2010/0198939 A1* | 8/2010 | Raleigh ............... H04L 41/0806 709/217 |

OTHER PUBLICATIONS

U.S. Office Action dated Jun. 20, 2014 in U.S. Appl. No. 13/792,588.
U.S. Notice of Allowance dated Oct. 2, 2014 in U.S. Appl. No. 13/792,588.
U.S. Office Action dated Jul. 2, 2012 in U.S. Appl. No. 12/806,761.
U.S. Notice of Allowance dated Dec. 17, 2012 in U.S. Appl. No. 12/806,761.
Kaasinen et al., "Two approaches to bringing Internet services to WAP devices," Computer Networks, Jun. 2000, vol. 33, pp. 231-246, Elsevier Science B.V., 2016.
"Browser-based, Feature-Rich Content Overlay Technology-Engaging Your Subscribers," InfoGin, retrieved at http://www.infogin.com/products/solutions.html,v=Search# on Jul. 28, 2016, InfoGin, 2016.

* cited by examiner

SYSTEMS, COMPUTER PROGRAM PRODUCTS, AND METHODS FOR GENERATING CUSTOM WEB PAGES FOR MOBILE DEVICES

CROSS-REFERENCE TO RELATED APPLICATIONS

This application is a continuation of U.S. patent application Ser. No. 13/792,588, filed Mar. 11, 2013, now U.S. Pat. No. 8,949,322, which is a continuation of U.S. patent application Ser. No. 12/806,761, filed Aug. 19, 2010, now U.S. Pat. No. 8,438,219.

TECHNICAL FIELD

The present disclosure relates generally to systems, computer program products, and methods for generating web pages and, more particularly, to systems and methods for generating custom web pages for specific requesting mobile devices.

BACKGROUND

There are hundreds of different models of mobile devices on the market today, with surely more to come. Most modern devices, such as smart phones, are enabled to access Internet web pages. Despite the advances in mobile devices and the great variety amongst the mobile devices, web pages are still often generated in a one-size-fits-all configuration, and specifically for larger personal computers (PCs), such as desktops, laptops, and tablet PCs.

As a result, web pages very often display awkwardly on mobile devices and are cumbersome for the users to navigate. In addition, because web pages are generated for more powerful computing devices, the amount of data in the pages is usually too high for efficient rendering on mobile devices, which slows download, presentation, and webpage navigation. And with the high and increasing number of users accessing the Internet from mobile devices, the larger web pages can cause unwanted latency and bandwidth consumption in the wireless data network.

One approach for addressing the existing challenges is to create a separate web site for each device on the market. Each of these web sites, though, would need to be hosted on a different domain or sub-domain. Hosting individual web sites on separate domains for each mobile device is prohibitively costly in numerous ways. For example, hosts would need to communicate (e.g., advertise) the various different domains to each of the respective mobile devices. And the mobile device users need to learn, remember, or store in a web page server a device-specific domain (e.g., hyptothetical domain, http://www.iphone.att.com) that is different than the top-level domain web page (e.g., http://www.att.com) they visit via their PC. Also, device-specific domains lack the benefits of top level domains, including ease of use and branding. Further, hosting individual web sites on separate domains for each type of mobile device requires substantial duplication, storage, and maintenance of content. Still further, new web sites and domains will have to be created for each new type of device entering the market.

According to another approach, a variation of the first, a host would begin with a common web site hosted on a primary, top-level domain. The host would then forward the web page content to device-specific domains (e.g., http://www.iphone.att.com). This approach alleviates the need for hosts to advertise the numerous device-specific domains, and for mobile device users to remember the device-specific domain appropriate for them. This approach, though, still has drawbacks including the requirement for duplication of content and the overhead of maintaining multiple sites. Further, delay is introduced by the process of forwarding the web page.

According to yet another approach, fully formed web pages are converted for use by a requesting mobile device. This approach, though, requires hosting and caching of a complete version of the web site for each type of mobile device. Also, this approach requires additional server resources and delay in converting an entire page from the original form to the converted form. For example, new versions of content must be created each time a conversion is needed, to suit the requesting device. Another drawback to this approach is that the frequently changing dynamic content may not be cached and thus adding significant delays in displaying the page.

The requirements of the aforementioned approaches undesirably consume personal and computing resources and increase the ultimate cost of providing and receiving services. A robust solution without the aforementioned drawbacks is needed.

SUMMARY

The present disclosure relates to a system for generating a web page portal customized for a particular requesting mobile device. The system includes an information store having a plurality of groups, each group being associated with mobile-device qualifications, web-design characteristics, and identification information corresponding to one or more types of mobile devices assigned to the group. The system also includes a custom web page development database (CWDD) including a plurality of web page component modules storing various forms of web page components, and a custom web page development server (CWDS) in communication with the information store and the CWDD. The CWDS is configured to (i) receive an incoming request for a web page from the particular requesting mobile device, (ii) identify a device type associated with the particular requesting mobile device, and (iv) determine an applicable group of the plurality of groups in the information store based on the device type of the particular requesting mobile device. The CWDS is also configured to (v) obtain web-design characteristics from the applicable group of the information store, (vi) access the CWDD and obtain applicable web page components from the web page component modules based on the web-design characteristics obtained from the applicable group of the information store, and (vii) generate the custom web page portal using the applicable web page components obtained from the CWDD.

In another aspect, the present disclosure relates to a non-transitory computer-readable medium storing instructions that, when executed by a processor, cause the processor to perform steps including receiving an incoming request for a web page from a particular requesting mobile device and identifying a device type associated with the particular requesting mobile device. The steps also include determining an applicable group of a plurality of groups stored in an information store based on the device type of the particular requesting mobile device, obtaining web-design characteristics from the applicable group of the information store, accessing a custom web page development database (CWDD) having web page component modules, obtaining applicable web page components from the web page component modules of the CWDD based on the web-design characteristics obtained from the applicable group of the information store, and generating the custom web page portal using the applicable web page components obtained from the CWDD.

In another aspect, the present disclosure relates to a method for generating a web page portal customized for a particular requesting mobile device. The method includes a custom web page development server (CWDS) receiving an incoming request for a web page from the particular requesting mobile device and identifying a device type associated with the particular requesting mobile device. The CWDS also determines an applicable group of a plurality of groups stored in an information store based on the device type of the particular requesting mobile device, obtains web-design characteristics from the applicable group of the information store, and accesses a custom web page development database (CWDD) having web page component modules. The CWDS further obtains applicable web page components from the web page component modules of the CWDD based on the web-design characteristics obtained from the applicable group of the information store and generates the custom web page portal using the applicable web page components obtained from the CWDD.

Other aspects of the present invention will be in part apparent and in part pointed out hereinafter.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

While the description includes a general context of computer-executable instructions, the present disclosure can also be implemented in combination with other program modules and/or as a combination of hardware and software. The terms "application," "program," or variants thereof, are used expansively herein to include routines, program modules, components, data structures, algorithms, and the like. Applications and programs can be implemented on various system configurations, including single-processor or multiprocessor systems, minicomputers, mainframe computers, personal computers, hand-held computing devices, microprocessor-based, programmable consumer electronics, combinations thereof, and the like.

The term "computer-readable media" and variants thereof, as used in the specification and claims, refers to storage media. In some embodiments, storage media includes volatile and/or non-volatile, removable, and/or non-removable media. For example, storage media includes random access memory (RAM), read-only memory (ROM), electrically erasable programmable read-only memory (EEPROM), solid state memory or other memory technology, CD ROM, DVD, or other optical disk storage, magnetic tape, magnetic disk storage or other magnetic storage devices, or any other medium that can be used to store the desired information

I. OVERVIEW OF THE DISCLOSURE

In various embodiments, the present disclosure describes systems and methods for developing a custom web page tailored for a particular mobile device, such as a particular type of smart phone, requesting the page. The system includes an information store including various groups into which mobile device types are grouped. The system includes a web page development database housing components (e.g., raw materials) for including in custom-designed web pages.

The system also includes a custom web page development server, which receives a web page request from a particular mobile device, accesses the information store to obtain web page characteristics appropriate for the group to which the requesting device is assigned, and constructs a web page tailored to the particular requesting mobile device using the appropriate web page components from the web page development database. The web page development server may also consider rules or preferences of the system, a communications service provider, and/or the device user in developing the custom web page, as described in greater detail herein.

The system is, thus, aware of the type of mobile device accessing it and the needs of the device based on its characteristics and any applicable other rules. As such, the system is said to be device-aware, or access-aware.

The present system can be said to recharacterize the web page request received from the particular mobile device. That is, the custom web page development server, in procuring custom web page characteristics specific to the group in the information store to which the particular requesting mobile device is assigned, essentially recharacterizes the generic request for a web page from the mobile device to require an optimal page for the particular type of device.

The custom-designed web page can be a web portal in the traditional sense, and also in a sense of being an amalgamation of components selected from the custom web page development database. With at least the latter perspective, each web page developed according to the present disclosure can be referred to as a type of web portal page.

II. MOBILE DEVICES

The various mobile devices available on the market differ in numerous ways, including screen size, screen shape, layout of keyboard/screen input, browser, and applications (e.g., navigation). The devices also have various other device capabilities and characteristics, such as processor speeds, and RAM capacity.

Figure 1:
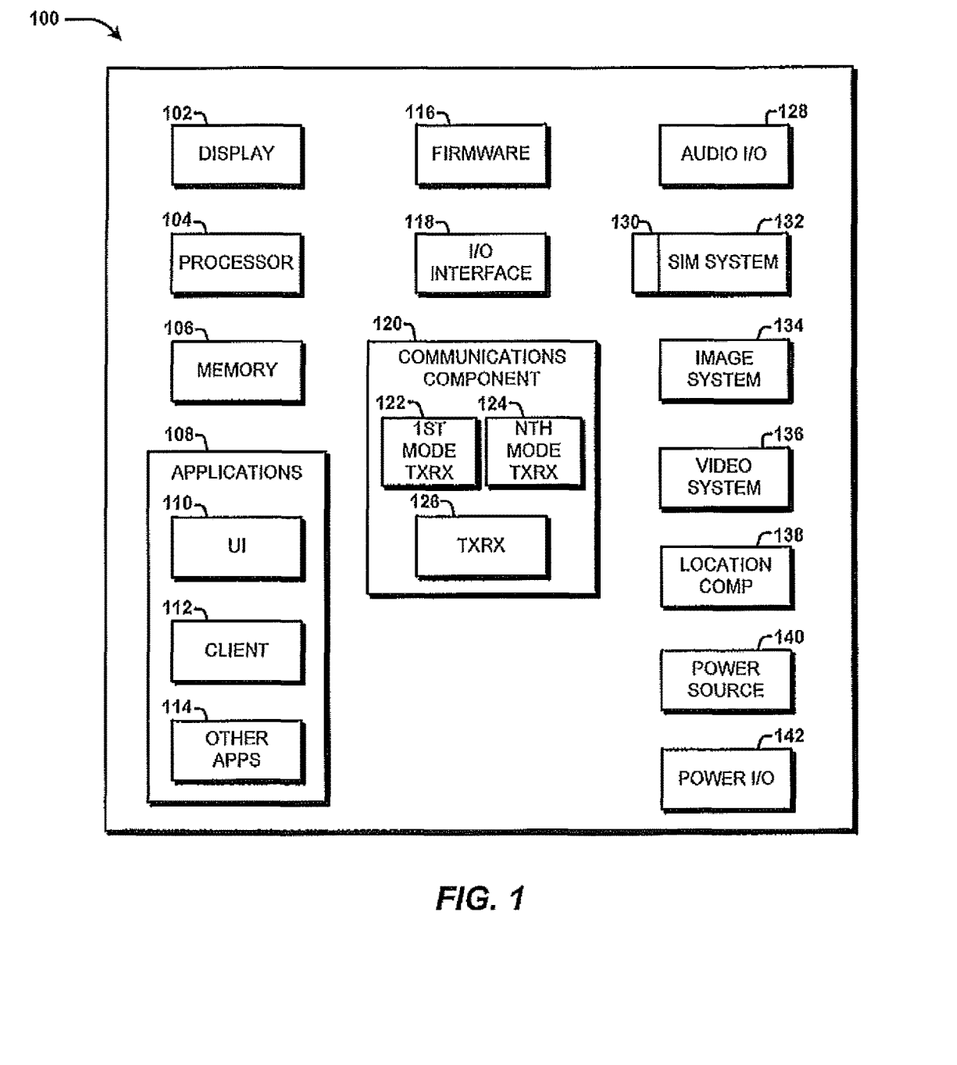
FIG. 1 illustrates a schematic block diagram of an exemplary mobile device for use in accordance with embodiments of the present disclosure.

Turning to the figures, and more particularly to the first figure, FIG. 1 illustrates a schematic block diagram of an exemplary mobile device 100 for use in accordance with embodiments of the present disclosure. The mobile device 100 may be, for example, a smart phone, other Internet or web-browing-enabled phone, or dedicated navigation device.

Although connections are not shown between all of the components illustrated in FIG. 1, the components interact with each other to carry out device functions. In some embodiments, for example, the components are arranged so as to communicate via one or more busses (not shown). It should be understood that FIG. 1 and the following description are intended to provide a general understanding of a suitable environment in which the various aspects of some embodiments of the present disclosure can be implemented.

In some embodiments, the mobile device 100 is a multi-mode headset and has a variety of computer readable media, including, for example, volatile media, non-volatile media, removable media, and non-removable media. The term "computer-readable media" and variants thereof, as used in the specification and claims, refers to storage media. In some embodiments, storage media includes volatile and/or non-volatile, removable, and/or non-removable media. For example, storage media includes random access memory (RAM), read-only memory (ROM), electrically erasable programmable read-only memory (EEPROM), solid state memory or other memory technology, CD ROM, DVD, or other optical disk storage, magnetic tape, magnetic disk storage or other magnetic storage devices, or any other medium that can be used to store the desired information and that can be accessed by the mobile device 100.

As illustrated in FIG. 1, the mobile device 100 includes a display 102 for displaying multimedia such as, for example, application graphical user interfaces (GUIs), text, images, video, telephony functions such as Caller ID data, setup functions, menus, music, metadata, messages, wallpaper, graphics, Internet content, device status, preferences settings, map and location data, routes and other directions, points of interest (POI), and the like. The illustrated mobile device 100 also includes a processor 104 for controlling, processing data, and/or executing computer-executable instructions of one or more applications, and a memory 106 for storing data and/or one or more applications 108. In some embodiments, the memory 106 stores information associated with determining location of the mobile device 100 according the methods described herein. For example, the memory 106 may store information including user preference factors and/or administrative factors set by an administrator, manufacturer, or service provider, which are described in more detail below.

In some embodiments, the application(s) 108 include a user interface (UI) application 110. The UI application 110 interfaces with a client 112 (e.g., an operating system (OS)) to facilitate user interaction with device functionality and data. In some embodiments, the client 112 is one of Symbian OS® (Symbian OS is a registered trademark of Symbian Limited, of London, England), Microsoft® Windows® Mobile OS (Microsoft and Windows are registered trademarks of the Microsoft Corporation of Redmond, Wash.), Palm webOS® (Palm WebOS is a registered trademark of the Palm Trademark Holding Company, of Sunnyvale, Calif.), Palm OS® (also a registered trademark of the Palm Trademark Holding Company), RIM® BlackBerry® OS (RIM and Blackberry are registered trademarks of Research In Motion Limited of Waterloo, Ontario, Canada), Apple® iPhone® OS (Apple and iPhone are registered trademarks of the Apple Corporation, of Cupertino, Calif.), or Google Android® OS (Android is a registered trademark of Google, Inc., of Mountain View, Calif.). These operating systems are merely exemplary of the operating systems that can be used in accordance with the embodiments disclosed herein. Other operating systems are contemplated.

The UI application 110 aids the user in entering message content, viewing received messages, answering/initiating calls, entering/deleting data, entering and setting user IDs and passwords, configuring settings, manipulating address book content and/or settings, interacting with other applications 114, and the like. In some embodiments, the other applications 114 include, for example, add-ons, plug-ins, location applications, e-mail applications, music applications, video applications, camera applications, power conservation applications, game applications, productivity applications, entertainment applications, enterprise applications, customer information management applications, accounting applications, authentication applications, applications, proprietary business applications, combinations thereof, and the like. The applications 108 are stored in the memory 106 and/or in a firmware 116, and can be executed by the processor 104. The firmware 116 can also store code for execution during device 100 power up, for example.

The illustrated mobile device 100 also includes an input/output (I/O) interface 118 for input/output of data, such as, for example, identification of web pages, browsing actions such as link selection. In some embodiments, the I/O interface 118 is a hardwire connection, such as, for example, a USB, mini-USB, audio jack, PS2, IEEE 1394, serial, parallel, Ethernet (RJ48) port, RJ11 port, or the like. In some embodiments, the I/O interface 118 accepts other I/O devices such as, for example, keyboards, keypads, mice, interface tethers, stylus pens, printers, thumb drives, touch screens, multi-touch screens, touch pads, trackballs, joysticks, microphones, remote control devices, monitors, displays, liquid crystal displays (LCDs), combinations thereof, and the like. It should be appreciated that the I/O interface 118 can be used for communications between the mobile device 100 and a network or local device, instead of, or in addition to, a communications component 120.

The communications component 120 interfaces with the processor 104 to facilitate wired/wireless communications with external systems. Example external systems include, but are not limited to, intranets, network databases, network storage systems, cellular networks, location systems, Voice over Internet Protocol (VoIP) networks, local area networks (LANs), wide area networks (WANs), metropolitan area networks (MANs), personal area networks (PANs), and other networks. In some embodiments, the external systems are implemented using WI-FI®, WIMAX®, combinations and/or improvements thereof, and the like (WI-FI is a registered trademark of Wi-Fi Alliance, of Austin, Tex.; WIMAX is a registered trademark of WiMax Forum, of Mountain View, Calif.). In some embodiments, the communications component 120 includes a multimode communications subsystem for providing cellular communications via different cellular technologies. In some embodiments, for example, a first cellular transceiver 122 operates in one mode, such as, Global System for Mobile communications (GSM), and an Nth cellular transceiver 124 operates in a different mode, such as Universal Mobile Telecommunications System (UMTS). While only two cellular transceivers 122, 124 are illustrated, the mobile device 100 may include more than two transceivers.

The illustrated communications component 120 also includes a transceiver 126 for use by other communications technologies such as, for example, WIFI, WIMAX, BLUETOOTH®, infrared, infrared data association (IRDA), near field communications (NFC), RF, and the like (BLUETOOTH is a registered trademark of Bluetooth SIG, Inc., of Bellevue, Wash.). In some embodiments, the communications component 120 also facilitates reception from terrestrial radio networks, digital satellite radio networks, Internet-based radio services networks, combinations thereof, and the like. The communications component 120 can process data from a network such as, for example, the Internet, an intranet, a home broadband network, a WIFI hotspot, and the like, via an ISP, DSL provider, or broadband provider.

In some embodiments of the present invention, audio capabilities for the mobile device 100 are provided by an audio I/O component 128 including a speaker to output audio signals and a microphone to receive audio signals.

The illustrated mobile device 100 also includes a slot interface 130 for accommodating a subscriber identity system 132 such as, for example, a subscriber identity module (SIM) card, a universal SIM (USIM) card, or a universal integrated circuit card (UICC). Alternatively, the subscriber identity system 132 can be manufactured into the device 100, thereby obviating the need for a slot interface 130. In some embodiments, the subscriber identity system 132 stores information associated with determining location of the mobile device 100 according the methods described herein. For example, the subscriber identity system 132 may store information including user preference factors and/or administrative factors set by an administrator, manufacturer, or service provider, which are described in more detail below. In some embodiments, the subscriber identity system 132 is programmed by a manufacturer, a retailer, a user, a computer, a network operator, or the like.

The illustrated mobile device 100 also includes an image capture and processing system 134 (image system). Photos can be obtained via an associated image capture subsystem of the image system 134, for example, a camera. The illustrated mobile device 100 also includes a video system 136 for capturing, processing, recording, modifying, and/or transmitting video content.

The illustrated mobile device 100 also includes a power source 140, such as batteries and/or other power subsystem (AC or DC). The power source 140 can interface with an external power system or charging equipment via a power I/O component 142.

The illustrated mobile device 100 also includes a location component 138 for use in determining geographic location of the mobile device 100. The location component 138 may include, for example, a Global Positioning (GPS) unit including a GPS receiver.

III. CUSTOMIZED WEB PAGE DEVELOPMENT ARCHITECTURE

Figure 2:
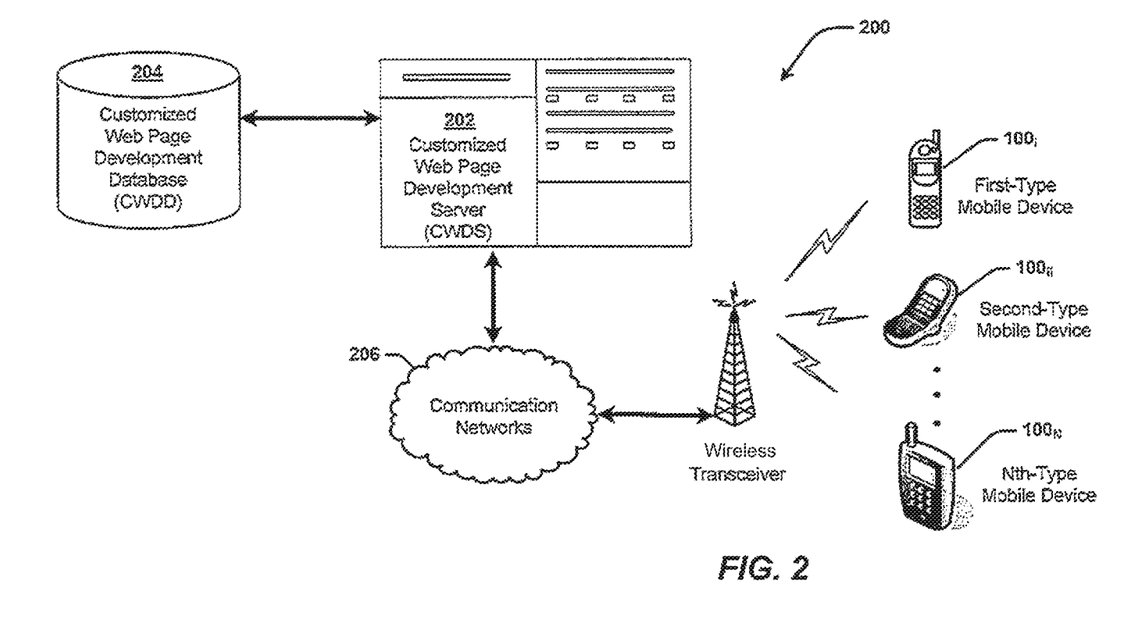
FIG. 2 illustrates an architecture for developing custom web pages tailored to characteristics and applicable rules for various types of mobile devices, in accordance with an embodiment of the present disclosure.

Turning to the next figure, FIG. 2 illustrates a customized web page development architecture 200 for custom-designing web pages specific to characteristics and any applicable rules for various types of mobile devices, according to an embodiment of the present disclosure. The customized web page development architecture 200 includes a customized web page development server (CWDS) 202 and a customized web page development database (CWDD) 204 associated with the CWDS 202. The CWDS 202 is in some embodiments a dynamic web server such as a server based on the Active Server Pages (ASP) web application framework (e.g., ASP.net), the Java Server Pages (JSP) framework, the C++ scripting language, or other languages.

As described in more detail below, the CWDS 202 in some embodiments (a) receives a request for a web page from a particular mobile device 100 via one or more communication networks 206 (e.g., cellular, WIFI), (b) identifies a type of the requesting mobile device 100 (e.g., amongst types $100_i$, $100_{ii}$, ..., $100_N$, where N is a positive integer), (c) identifies which of a plurality of pre-constructed device groups the mobile device 100 belongs to, (d) identifies group characteristics, (e) accesses component storage modules of the CWDD 204, (f) selects appropriate web page components (i.e., web page raw materials) from the storage modules based on the identified mobile device group and its characteristics, (g) constructs a web page using the selected components from the component storage modules, and (h) delivers the web page to the particular requesting mobile device 100 via the communication network(s) 206.

In some embodiments, the CWDS 202, in (f) selecting appropriate web page components from the component storage modules based on the identified mobile device group, also (f') considers one or more device/user characteristics related to the mobile device 100, to the device user, and/or to an account for the user or device, such as operational characteristics. These device/user characteristics can include, as provided in more detail below, a present location of the mobile device 100, preferences on account for the user, and preferences presented in the process of procuring the web page by the user. For example, the communications service provider may establish rules affecting content distribution or page layout based on whether the particular requesting mobile device is in an area serviced by a service provider or is roaming.

As also described further below, the CWDS 202, in (f) selecting appropriate web page components from the component storage modules based on the identified mobile device group, also (f") considers one or more system characteristics, preferences, or rules (collectively, rules, herein for ease of explanation) associated with the host operating the CWDS 202 and/or preferences or rules associated with service provider. In some embodiments, the service provider hosts the CWDS 202. In other embodiments, the web page owner hosts the CWDS 202.

As provided in more detail below, these system rules in some embodiments relate to one or more types of wireless networks being used by the mobile device 100 to access the CWDS 202 (e.g., cellular, WIFI, WIMAX, etc.), time of day of the request, network data traffic history and/or at the time of the request, and services or limitations applicable to mobile devices $100_{1-N}$ of the identified type, in general, or to the particular requesting mobile device $100_N$. Rules related to these and other variables can be established to assist the CWDS 202 host or service provider in controlling bandwidth being used to satisfy Internet data requests, while continuing to provide the customer with a desired experience.

As another example, service provider in some embodiments has established various formats of data accessible by the CWDS 202. In these embodiments, the users of mobile devices can elect amongst the formats for controlling the amount and/or cost of the data they receive. For instance, for a higher cost, a user could elect a more data-intense format, in which case the CWDS 202 would include more data in web pages tailored for the user's device, or could elect a less data-intense format, in which case the CWDS 202 would include less in web pages tailored for the user's device.

In another contemplated embodiment, the rules include a trigger associated with a preset limit of data usage for the user. In a particular embodiment, the CWDS 202 provides more data-intense web pages (e.g., more data regarding one or more types of content) until the CWDS 202 determines that the trigger has been met, after which the CWDS 202 provides less data-intense web pages according to the rule.

In one embodiment, the CWDS 202 is configured to present users of mobile devices with an option for higher-data or lower-data web pages. The option may simply be between high and low, or levels on a graduated scale, such as by allowing election of a particular level (e.g., on a scale of 1 to 5, or 1 to 10, etc.). This option can be presented at any time, such as during an original initialization of the device, during an initiation period for data service, or on the fly in response to a web page request.

IV. CUSTOMIZED WEB PAGE DEVELOPMENT SERVER

Figure 3:
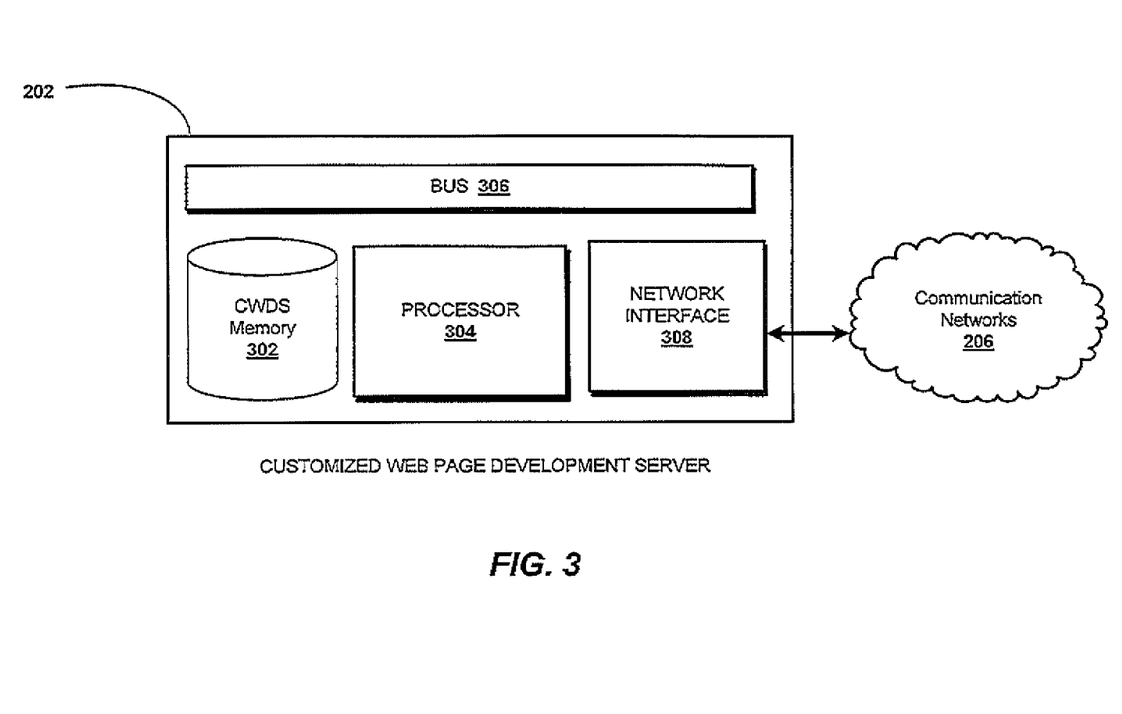
FIG. 3 illustrates a customized web page development server of the architecture shown in FIG. 2, in accordance with an embodiment of the present disclosure.

FIG. 3 illustrates the CWDS 202 in more detail according to an embodiment of the present disclosure. The CWDS 202 includes at least one CWDS memory 302 and at least one processor 304 in communication with the CWDS memory 302 via a data bus 306. The CWDS memory 302 includes one or more storage modules storing computer-readable instructions executable by the processor 304 to perform the functions of the CWDS 202 described herein. The CWDD 204 may be separate from and connected to the CWDS 202, or a part of the CWDS 202, such as by being a module of the CWDS memory 302. The CWDS 202 also includes a network interface 308 by which the CWDS 202 communicates via the data bus 306 with the communication network 206.

V. MOBILE DEVICE INFORMATION STORE

Figure 4:
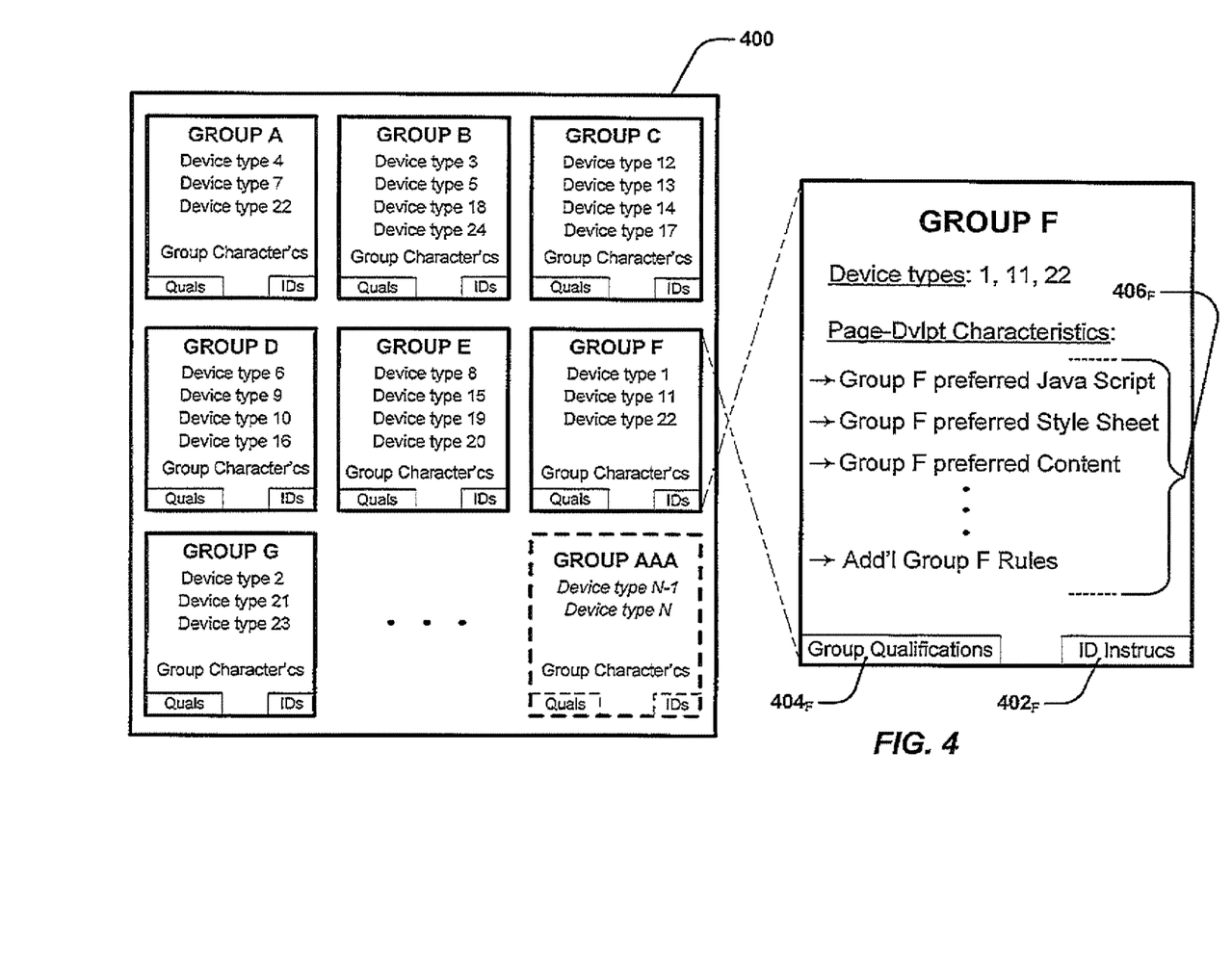
FIG. 4 illustrates an information store of the architecture of FIG. 2, in accordance with an embodiment of the present disclosure

FIG. 4 illustrates a mobile device information store 400, in accordance with an embodiment of the present disclosure. As an example, the information store 400 in some embodiments is a file-based information store. The CWDS 202 is in communication with the information store 400 for accessing select information in the information store 400 for developing web pages customized for mobile devices $100_{1-N}$ having a type identified in the store 400.

In one embodiment, the information store 400 is a part of the CWDD 204, and in another embodiment, it is a part of the CWDS memory 302. In one embodiment, the information store 400 includes a portion positioned in the CWDD 204 and another portion positioned in the CWDS memory 302.

The information store 400 identifies various groups in which mobile devices $100_{1-N}$ are categorized, along with information specific to each group. In the figures, the various groups are listed for explanatory purposes as GROUP A, GROUP B, etc., and the various styles of mobile devices $100_{1-N}$ are shown as Device type 1, Device type 2, etc. The groups and devices may be recognized by the CWDS 202 in any of a variety of ways, such as by a separate identification code (not shown) for each group and for each device type. Each device, for instance, may be represented by a device identifier, as provided further in the following paragraph. The number of groups, and devices per group, are shown in FIG. 4 for purpose of illustration. The information store 400 may include any number of groups and each group may include any number of device types, including one.

The aforesaid instructions for execution by the CWDS 202 include those enabling the CWDS 202 to identify an incoming request for a web page with the type of device. The type of device is used by the CWDS 202 to identify the applicable group for procuring applicable characteristics from the information store 400. In one embodiment, group membership identification information is stored in the storage medium holding the information store 400, and in a particular embodiment stored as part of the information store 400, as shown for example by reference numeral $402_F$ in the zoomed field of FIG. 4 in connection with GROUP F. The identification information 402 are in other embodiments stored in another storage medium of the custom web page development architecture 200. In one embodiment, the CWDS 202 identifies requesting devices by a user-agent property of a browser of the particular requesting mobile device identified in an incoming request message, such as in a header of an HTTP (Hypertext Transfer Protocol) message.

The mobile device types, in some embodiments, correspond with a mobile device model. For example, device types may include the iPhone®, the Blackberry Curve®, the Blackberry Torch, and other devices (iPhone is registered trademark of Apple, Inc., of Cupertino, Calif.; Blackberry and Blackberry Curve are registered trademarks of Research In Motion, Ltd., of Waterloo Canada).

The custom web page design architecture 200 includes qualification information for use by the CWDS 202 in assigning a device type to a group. In one embodiment, the qualification instructions are stored in the storage media housing the information store 400, and in a particular embodiment, stored as part of the information store 400, as shown for example by reference numeral $404_F$ in the zoomed field of FIG. 4 in connection with GROUP F. The qualification information 404 includes qualifying (e.g., required) device characteristics for the group, which in some scenarios includes one or more ranges of characteristics that a device must have or fall into to be classified in the group. In another embodiment, the group qualifications 404 are housed in the CWDS memory 302 for use by the CWDS 202 in assigning a mobile device to a group of the information store 400.

Grouping devices provides efficiencies to the custom web page generation process by reducing development and maintenance of separate web page development characteristics for each mobile device, especially separate web page development characteristics for types of mobile devices that are significantly similar. On the other hand, by requiring a higher level of similarity for mobile devices to be grouped, thus likely resulting in more groups, and generally less mobile devices per group, web pages could be more-accurately tailored to the requesting mobile device $100_N$. As required levels of similarity for grouping are increased, the information store 400 approaches an embodiment of the present disclosure in which each device is essentially its own group.

The information store is, in various embodiments, designed or updated, such as by a designer and/or a component of the present architecture 200 (e.g., CWDS 202) to set group qualifications to achieve a desired balance between higher efficiencies obtainable from more grouping and higher web-page customization obtainable from less grouping.

Group qualifications and/or mobile device characteristics can be represented in a variety of ways, such as by a numeric value corresponding to a screen size, a numeric value corresponding to screen shape, a binary representation of whether the device has or does not have a particular quality, etc. In one contemplated embodiment, the qualifications for a group are represented by a combination of factors including any of the mobile device characteristics described herein, such as screen size, screen shape, screen resolution, browser capabilities, navigation capabilities, input mechanism (e.g., keyboard, touch pad, scroll wheel, roll ball, mouse, joystick, directional pad, analog stick, or touch screen), and other device capabilities.

In a particular contemplated embodiment, some or all of the various factors are weighted and combined to form a qualification. For instance, the qualification may be configured so that a close correlation in device screen size weighs more than a close correlation in another characteristic of devices, such as device scrolling mechanism (e.g., screen-touch gesture, scroll button(s), roller ball, etc.) in determining whether a mobile device qualifies for a certain group.

Primary features of the information store 400 are web page development characteristics, including group-specific web page development characteristics. Particularly, each group represented in the information store 400 includes corresponding group-specific web page development characteristics, as shown for example by 406$_F$ in the zoomed field of the GROUP F in FIG. 4, In one contemplated embodiment, the web page development characteristics 406 include device-specific web page development characteristics 406 for consideration by the CWDS 202 in developing custom web pages. By executing device-specific web page development characteristics 406, the CWDS 202 can develop different custom web pages for devices of the same group (e.g., Device Types 1 and 11 of GROUP F).

The web page development characteristics 406 include group-specific, and in some embodiments, device-specific, factors used by the CWDS 202 when accessing the CWDD 204 to create a customized web page for a particular requesting mobile device 100. One exemplary web page development characteristic 406 is Java Script, as shown in the zoomed field of FIG. 4 in connection with GROUP F.

Another exemplary web page development characteristic 406 is Web Style Sheet, as shown in the zoomed field of FIG. 4. Web Style Sheets represent one way to define separation of presentation and content for web pages using a markup language (e.g., Hypertext Markup Language (HTML), or Extensible HTML (XHTML)). Another exemplary web page development characteristic 406 is Server Configuration Files, as also shown in FIG. 4.

Another exemplary web page development characteristic 406 is Preferred Content, as shown in the zoomed field of FIG. 4. Preferred Content includes rules for use by the CWDS 202 in selecting amongst various types and/or levels of content available for the web page being developed. The types of content in some embodiments include text, image, video, and documents (as shown in connection with web page component storage modules 502$_5$, 502$_7$, and 502$_9$ in the FIG. 5 view of the CWDD 204). Selection and presentation of web-page content based on web page development characteristics 406, such as preferred Content, is described further below in connection with the method 700 illustrated in FIG. 7 for custom-developing a device-specific web page.

By providing the framework for developing a custom web page for the devices in the various groups, the information store 400 effectively presents templates, which act as a filter through which the CWDS 202 generates the custom web pages.

The information store 400, in some embodiments, also includes additional rules for use by the CWDS 202 in developing device-specific custom web pages. The rules may include, for example, one or more preferences established by a host of the CWDS 202 or a communications service provider, which, as mentioned above, may be the same entity. Preferences may be specific to one or more groups, or, as mentioned above regarding web page development characteristics 406, in general, particular to one or more types of mobile devices. As an example, the additional rules may include a preference established by the service provider that, for one or more certain device groups or one or more particular devices, lower levels of select web-page content be provided, at least in an initial web-page presented to a device, during peak hours of network operation (e.g., between 11:00 a.m. and 2:00 p.m.).

Other exemplary additional rules affecting content selection are based on a speed of connection between the mobile device and the network, or on a location of the mobile device and the device type or group. For example, in some embodiments, the CWDS 202 delivers location-specific content to the particular requesting mobile device. Location-specific content in some embodiments includes content that may be, or is likely to be, of interest to the user of the device based on their location, such as advertisements or coupons related to the location.

The rules considered by the CWDS 202 in some embodiments include rules related to demographics of the users of mobile devices. In some particular embodiments, the demographics are supplied by the users and/or deducted based on device operation. Rules related to demographics of a user can be referred to as a tag cloud. For instance, a user may indicate that they are a graduate of a certain university and like a certain sport, the indications would become a part of a tag cloud associated with the user. The rule in this case causes the CWDS 202 to include in the custom web page available content related to, for example, an upcoming soccer match for the university. The rule could also relate to location, so that the content about the match is presented to the user when the user is in a location near the match (e.g., on a Friday business trip, and perhaps otherwise unaware that her alma mater is playing nearby on Saturday morning).

The information store 400 is updated to include new devices added to the marketplace. A new device can be added to an existing group or a new group can be created for the new device, as appropriate, based at least in part on a comparison between characteristics and capabilities of the new device and qualifications of existing groups.

It is contemplated that the CWDS 202 will at times receive requests for web pages from mobile devices that are not specifically assigned to a group in the information store 400. In some embodiments, the information store 400 includes a default, or catch-all group (not shown in detail) including default page-generation characteristics 406. The default page-generation characteristics 406 can be configured, for example, to include average, median, and/or most common levels or values of web-page characteristics to increase the likelihood that the page will be tailored in ways most suitable for the unsupported device.

VI. CUSTOMIZED WEB PAGE DEVELOPMENT DATABASE

Figure 5:
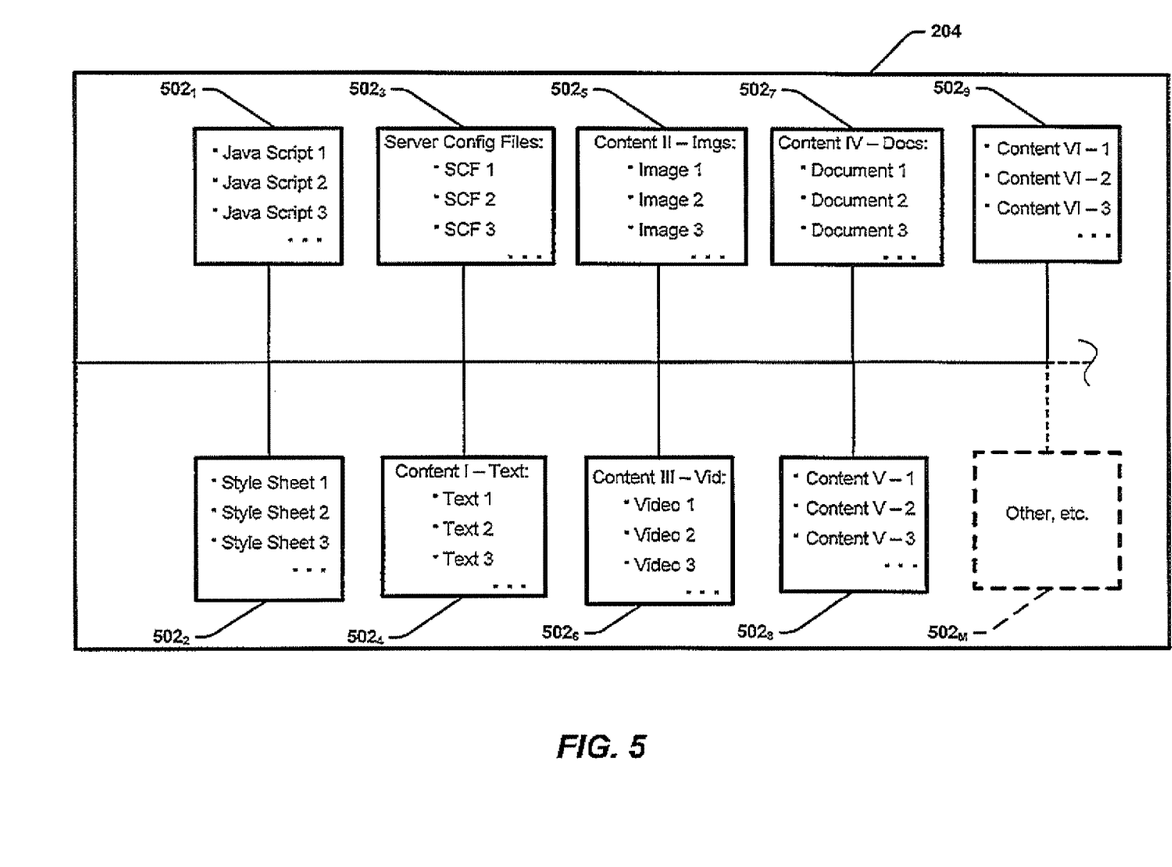
FIG. 5 illustrates a customized web page development database of the architecture shown in FIG. 2, in accordance with an embodiment of the present disclosure.

FIG. 5 illustrates the CWDD 204, of the architecture 200 shown in FIG. 2, in accordance with an embodiment of the present disclosure. The CWDD 204 includes a plurality of web page component storage modules $502_1$, $502_2$, ..., $502_M$, where M is a positive integer. In one embodiment, each storage module 502 holds multiple web page components of the same type. The CWDD 204 can be analogized to a warehouse structure, whereby components, or raw materials, for a product (customized web pages) are stored. More particularly, in some embodiments, the components are stored in component storage modules 502 depending on the component types. Because separate components for the web page are cached in the CWDD 204, and the CWDS 202 procures needed components to generate the custom page, there is no need to cache an entire web page in its completed form.

The CWDS 202, for tailoring a web page most suitable for the mobile device, selectively accesses the component storage modules 502, procures components therein, based on at least the type of mobile device requesting a web page. As mentioned above, and below in more detail, the CWDS 202 also considers variable such as characteristics associated with mobile device operation, the user of the particular requesting mobile device, the CWDS 202, utilized network (s), time of day, location of the device, network data traffic (historic and/or present), service format option (e.g., higher-data or lower-data plan election), and services or limitations applicable to mobile devices of the identified type, in general, or to the particular requesting mobile device.

Exemplary web page component storage modules 502 and the components they can hold are now described, according to various embodiments of the present invention. A first content storage module $502_1$ stores various forms of Java Scripts. A second content storage module $502_2$, stores various forms of Style Sheets. A third content storage module $502_3$, stores various types of server configuration files.

Additional content storage modules $502_{4-8, \ etc}$, store various forms of content. Content may include, for example, any of text, HTML data, images, videos, and documents. For example, as shown in FIG. 5, a fourth content storage module $502_4$, stores various forms of text, a fifth content storage module $502_5$, stores various forms of images, a sixth content storage module $502_6$, stores various forms of video, and a seventh content storage module $502_7$, stores various documents. Other modules (e.g., $502_{8, \ 9, \ etc}$.) store other types of content.

VII. METHOD OF GROUPING DEVICES IN AN INFORMATION STORE

Figure 6:
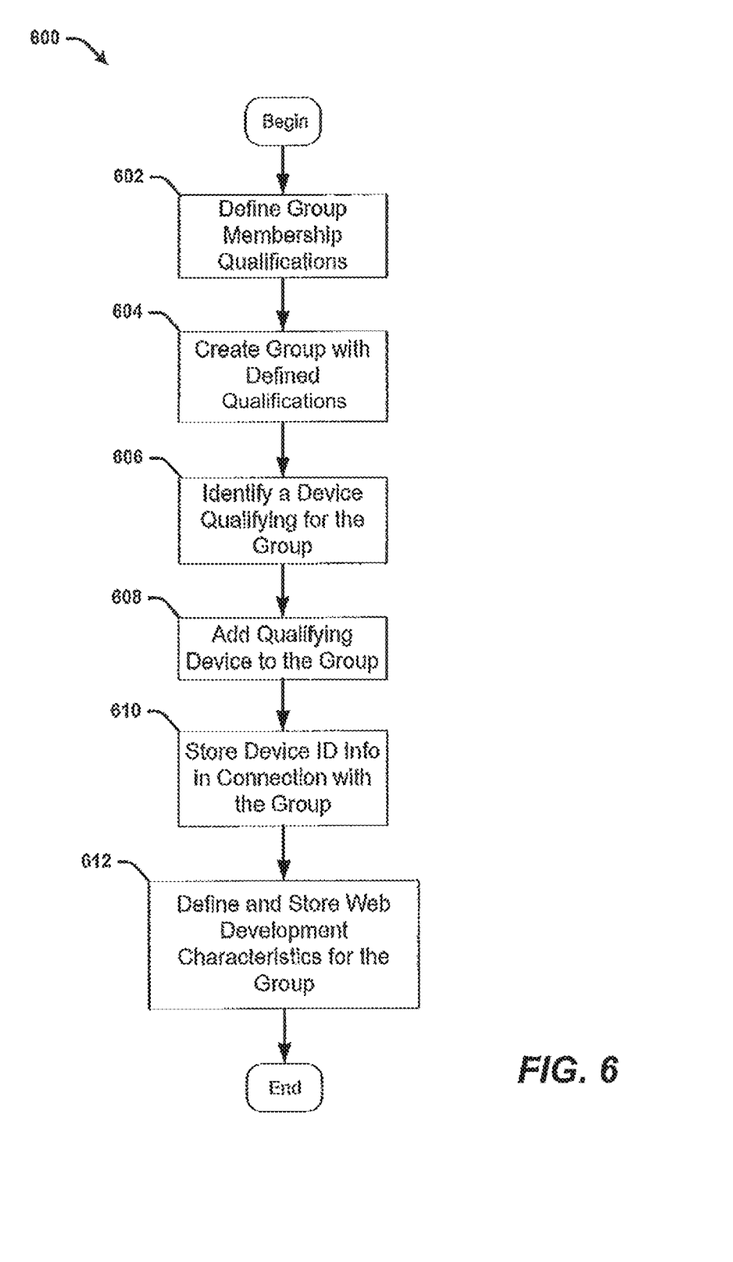
FIG. 6 illustrates an exemplary method for grouping mobile device types in a web page customization information store, according to an embodiment of the present disclosure.

FIG. 6 shows an exemplary method 600 for grouping mobile device types in a web page customization information store 400, according to an embodiment of the present disclosure. It should be understood that the steps of the method 600 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 600 can be ended at any time. In certain embodiments, some or all steps of this process, and/or substantially equivalent steps are performed by execution of computer-readable instructions stored or included on a computer readable medium, such as the memory 302 of the CWDS 202 and/or the CWDD 204, for example. The method 600 is performable by execution by the processor 304 of the CWDS 202, as discussed primarily for explanation purposes, or another processor.

The method 600 begins and flow proceeds to step 602, whereat the CWDS 202 defines membership qualifications (e.g., qualifications $404_F$ in FIG. 4) for at least one group to be stored as part of the information store 400. At step 604, the CWDS 202 creates the group having the defined qualifications. In various embodiments, the qualifications include any combination of variables, such as a screen size, a screen shape, a screen resolution, browser capabilities, navigation capabilities, input, and other device qualities. In one contemplated embodiment, qualities of a particular device are used to define the group.

At step 604, the CWDS 202 also stores the qualifications 404 of the created group in the information store 400 in connection with the group. The qualifications 404 will be available for the CWDS 202 to reference when the CWDS 202 is considering adding device types in the future.

At step 606, the CWDS 202 identifies at least one type of device that fits the qualifications 404 of the group. At step 608, the CWDS 202 assigns the identified qualifying mobile device type to the created group in the information store 400. For the contemplated embodiment in which qualities of a particular mobile device was used to define the group, that device is of course assigned to the group defined as such. At step 610, the CWDS 202 stores identifying information, such as a user-agent property of a browser of the type of device added to the created group. At step 612, the CWDS 202 defines and stores web page development characteristics for the group. The CWDS 202 uses these characteristics for developing custom web pages tailored to a requesting mobile device assigned to the created group, which development is further defined below in the method 700 illustrated in FIG. 7.

The method 600 can be repeated until all mobile devices available on the market, or a subgroup of available devices, are assigned to one of the groups. When a device is being evaluated for addition to the information store 400 and the device does not satisfactorily match an existing group, in some embodiments the CWDS 202 creates a new group to accommodate the new device.

VIII. METHOD OF CUSTOM GENERATING A WEB PAGE FOR A MOBILE DEVICE

Figure 7:
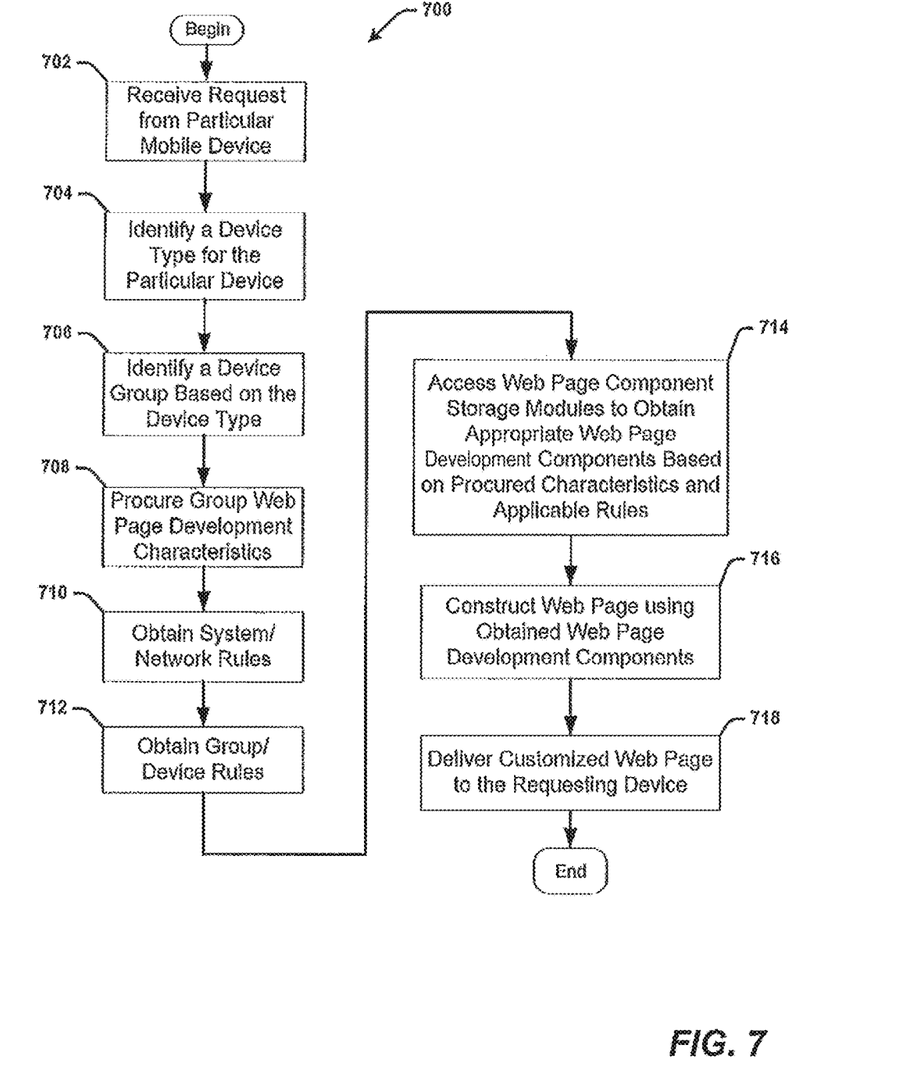
FIG. 7 illustrates an exemplary method for generating a web page tailored to a requesting mobile device, according to an embodiment of the present disclosure.

FIG. 7 shows an exemplary method 700 for developing a custom, device-specific, web page using the CWDS 202, according to an embodiment of the present disclosure. It should be understood that the steps of the method 700 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 700 can be ended at any time. In certain embodiments, some or all steps of this process, and/or substantially equivalent steps are performed by execution of computer-readable instructions stored or included on a computer readable medium, such as the memory 302 of the CWDS 202 and/or the CWDD 204, for example.

The method 700 begins and flow proceeds to step 702, whereat the CWDS 202 receives a request for a web page from a particular mobile device 100 via one or more communication networks 206 (e.g., data, cellular)(see FIG. 2). The request may be in the form of, for example, an HTTP message.

At step 704, the CWDS 202 identifies a type of the mobile device 100, e.g., amongst types 1, 2, . . . , N, where N is a positive integer. As described above, in one embodiment, the CWDS identifies the device type using a user-agent property of the browser of the requesting device, which property can be identified, for example, in the incoming request message, such as in a header of an HTTP request message.

At step 706, the CWDS 202 identifies which of a plurality of pre-constructed device groups, of the information store 400 in FIG. 4, the mobile device 100 belongs to. At step 708, the CWDS 202 accesses the identified group file of the information store 400 to procure custom web page development characteristics particular to the group. Exemplary custom web page development characteristics include Java Script, Style Sheet, Server Configuration Files, and content preferences, particular to the group of which the requesting device is a member.

The custom web page development characteristics identified in the information store 400 are those determined, e.g., in step 612 of the method 600 described above in connection with FIG. 6, to be most suitable for requesting devices of the group. As described above, a most suitable page for the particular device, may use a particular Java Script, a particular Style Sheet, particular Server Configuration Files, and particular content, as identified in the information store 400 in connection with the group to which the requesting mobile device is assigned.

For example, the characteristics in the information store 400 for the group to which the particular requesting device is assigned may call for the CWDS 202 to obtain, from the CWDD 204, a web article headline of only seven or less words. A longer version of the same headline may be provided to requesting mobile devices of another group of the information store 400, depending on the characteristics of the other group. The shorter text preference for the group to which the particular requesting mobile device is assigned may have been determined (e.g., in step 612 of the method 600 described above in connection with FIG. 6), for instance, due to a relatively-small display screen for devices in the particular group and/or other factors related to the devices in the particular group, such as processor speed.

Or the characteristics in the information store 400 for the group to which the particular requesting device is assigned may call for the CWDS 202 to obtain, from the CWDD 204, only two or three headlines corresponding to top web articles. A heavier version of the same article summary, including for example, five to ten headlines or more, may be provided to requesting mobile devices of another group of the information store 400, depending on the characteristics of the other group.

Similarly, the characteristics in the information store 400 for the particular group to which the particular requesting device is assigned may call for the CWDS 202 to obtain a summary of a web article for inclusion in the web page for the device. A longer version, such as the full article, may be provided to requesting mobile devices of another group of the information store 400, depending on the characteristics of the other group.

As another example, the characteristics in the information store 400 for the particular group to which the particular requesting device is assigned may call for the CWDS 202 to obtain a relatively-short version (e.g., clip or snippet) of a video, and/or less videos overall for inclusion in the web page for the device. A longer version of the same video and/or more videos overall may be provided to requesting mobile devices of another group of the information store 400, depending on the characteristics of the other group. The preference for shorter and/or lower number of videos for the group to which the particular requesting mobile device is assigned may have been determined (e.g., in step 612 of the method 600) due, for instance, to a relatively-slow processing speed for devices in the particular group and/or other factors related to the devices in the particular group.

In some embodiments, some or all inclusions of limited information (e.g., text, images, and video) in the custom web page are accompanied by an option (e.g., web link) for more information, such as a full title, a longer or a full version of a video, etc. In this way, the particular mobile device is presented with an initial web page that is most conducive to rendering, presentation, and/or navigation on the requesting mobile device, and the user of the device has the option of obtaining additional information as desired.

At step 710, the CWDS 202 identifies any other applicable rules for generating the custom web page for the particular requesting device. The other rules may include, for example, rules established by a host operating the CWDS 202, and/or by a server provider.

These rules may include, for example, a rule to provide a relatively-limited version of some or all data (e.g., text, images, videos, or documents) if the request is being serviced during a time period determined from historical data to be a peak period for data traffic, or during a time period determined based on contemporary data to be relatively busy at present (e.g., busy beyond a threshold) for the network.

As another example, the rules may identify web page components (e.g., components of the CWDD 204) or include characteristics identifying web page components, based on a type of wireless network through which the particular requesting mobile device is requesting the web page. For example, the rule may require that the CWDS 202 provide relatively-small pieces of content when the mobile device is communicating via a WIFI network, compared to a cellular network. These rules are described further above.

It is contemplated that applicable rules may be stored in and retrievable from the CWDD 204 in connection with the particular device type and/or the particular group to which the particular requesting device is assigned. In some embodiments, the CWDS 202 obtains such application rules in step 708.

At step 712, the CWDS 202 identifies any rules specific to the requesting device, such as preferences set by the user, a program for which the web page is being requested, the host of the CWDS 202, and/or a service provider. In one contemplated embodiment, the CWDS 202 communicates with a Home Location Register (HLR) associated with the device to obtain information that the CWDS 202 uses in determining web page components to procure from the CWDD 204 for the custom web page. It is contemplated that these other applicable rules, as well, may be stored in and retrievable from the CWDD 204 in connection with the particular device type or the particular group to which the particular requesting device is assigned. Thus, in some embodiments, the CWDS 202 obtains such application rules in step 708.

An exemplary rule for a user may include a preference to receive pages without delivery of audio automatically (i.e., without express request for audio) during business hours (e.g., 8:00 a.m. to 5:00 p.m.). As another example, a preference may require presentation of more-detailed content when the mobile device is requesting information from a first location (e.g., a home city or area of the user), and presentation of less-detailed content when the mobile device is requesting the page from a second location (e.g., a city other than the user's home city or area). The location of the device may be determined in conventional ways, such as by using a GPS unit of the particular requesting mobile device, or a recent position stored at a HLR associated with the particular device.

At step 714, the CWDS 202 accesses component storage modules 502 of the CWDD 204 to obtain select components (i.e., raw materials for web-page development), based on the web page development characteristics and rules obtained in steps 708, 710, and 712, for developing the custom web page. In some contemplated scenarios, the CWDD 204 will include only a single component of a certain type and so there is no decision for the CWDS 202 with respect to that certain component. For example, the CWDD 204 may include only one version of an image for inclusion in web pages, and so in one contemplated embodiment that image is included in its only form in every web page. In another contemplated embodiment, group or device characteristics, or applicable rules, require that, when there is only one available version of the certain component, the CWDS 202 is to obtain either the only available version of the certain component, or not obtain the version, for inclusion in the custom web site being tailored for the requesting device.

As described above, in some embodiments, the information store 400 includes a default group (not identified in detail) including default web page-generation characteristics for use by the CWDS 202 when a mobile device requesting the web page is not found in the existing groups of the information store 400. In those embodiments, the CWDS 202 at step 708, procures default web page characteristics from the default group and, at step 714, obtains default web page-generation components from the CWDD 204 corresponding to the default web page characteristics. As described, above, default page-generation characteristics are in some embodiments configured to include an average, a median, and/or most common levels or values of web page characteristics to increase the likelihood that the page will be tailored in ways most suitable for the unsupported device.

At step 716, the CWDS 202 constructs a custom web page tailored for the assigned requesting mobile device using the components procured from the CWDD 204, and any applicable identified rules or preferences, as described above.

In some particular embodiments, pages are coded in either standard HTML or a template particular to a web server system being utilized. In particular embodiments, web page generation is optimized when the pages are designed with separations of content (data), markup tags (HTML), and visual elements (Style-Sheets), and behavior (Java-Script). In some particular embodiments, visual elements are defined in Style-Sheets and applied to page layouts and modules.

In some embodiments, page layout is based on modular design so that content selection criteria may be configured and applied easily. Page layout and modules are in some embodiments coded, for example, using basic HTML tags such as <div>, <label>, <a>, <img>, <li>, etc. All interactive and behavioral elements are defined, for example, using applicable Java Scripts. In some embodiments, the content preferably does not have embedded markup tags.

At step 718, the CWDS 202 delivers the custom-developed, mobile device-specific, web page to the mobile device 100 via the communication network(s) 206. As described above, the web page can be a web portal, in traditional sense, and also in a sense of being an amalgamation of components from the CWDD 204. With the latter understanding, each web page developed according to the present disclosure is said to be a web portal page.

In one contemplated embodiment, the steps 704-716 (e.g., steps of steps 708-716) are performed before step 702. In this way, the CWDS 202 anticipates the request of step 702 and the customized web page is available for faster delivery to the eventually requesting device. This embodiment could be especially helpful when, for example, the CWDS 202 is receiving or expecting to receive a large number of requests for a particular page, from one or more types of mobile devices, such as in connection with a high-profile news event occurring or expected to occur.

V. CONCLUSIONS

The systems and methods of the present disclosure allow maintenance of custom web page components (i.e., raw web page materials) at a single domain for development of mobile device-specific web pages. In this way, there is no need to develop multiple domains for various versions of the same page, or domain forwarding, which requires extra resources and additional page load time. Maintaining a single web page also saves hardware, allows a host to maintain a primary brand domain, and allows easier maintenance of a web site.

Another potential benefit of the present systems and methods is that web server functionality, new features and business logic are automatically available for inclusion in mobile device-specific web sites without requiring additional development of multiple particular web pages. Also, generally the same personnel (e.g., development team, testing team, and support team) can develop and/or maintain the present system, using existing processes, which significantly reduces cost. Further, new development and features (e.g., web-page components (e.g., content)) benefit the devices at no cost as they are implemented into new custom web page portals.

Without the need to store separate web pages, e.g., at separate domains, server platform functionalities such as security, caching, buffering, business reporting, page optimizations, error handling, business logic can be maintained once and reused for each custom web page, and so not separately maintained and performed.

And because the system can be implemented on one server, or a group of the same web servers, separate integrations are not required. When a new mobile device is available, corresponding information is added to the information store 400 and the CWDD 204, and separate hardware and servers are not required.

Various embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model, or pattern. The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A web page development system comprising:
a processor; and
a computer-readable storage device comprising instructions that, when executed by the processor, cause the processor to perform operations comprising:
receiving, from a requesting mobile device, an incoming request for a web page,
determining, based on a device type of the requesting mobile device, whether the requesting mobile device belongs to one of a plurality of groups, wherein the plurality of groups are stored in an information store, and wherein each of the plurality of groups is associated with corresponding custom web page development characteristics for constructing custom web pages suited for corresponding qualifications defined for each of the plurality of groups,
obtaining, in response to determining that the requesting mobile device does not belong to one of the plurality of groups, default web page development characteristics from a default group for constructing a custom web page for the requesting mobile device,
identifying additional characteristics for constructing the custom web page based on a type of a wireless network through which the requesting mobile device is requesting the web page, a location associated with the requesting mobile device when the incoming request for the web page is received, a time of day when the incoming request for the web page is received, and a trigger associated with a preset limit of data usage for a user of the requesting mobile device,
selecting web page components based on the default web page development characteristics and the additional characteristics, and
constructing the custom web page for the requesting mobile device based on the web page components.

2. The web page development system of claim 1, wherein the default web page development characteristics of the default group are associated with levels of web page development characteristics that increase a likelihood that the custom web page to be generated will be tailored for the requesting mobile device that does not belong to one of the plurality of groups.

3. The web page development system of claim 1, wherein the additional characteristics for constructing the custom web page based on the type of the wireless network through which the requesting mobile device is requesting the web page, the location associated with the requesting mobile device when the incoming request for the web page is received, the time of day when the incoming request for the web page is received, and the trigger associated with the preset limit of data usage for the user of the requesting mobile device are set forth in rules provided by at least one of an operator of the web page development system, a communications service provider, or the user of the requesting mobile device.

4. The web page development system of claim 1, wherein the processor is in communication with:
the information store including the plurality of groups and the default group; and
a custom web page development database including the web page components, each of the web page components associated with a corresponding one of the default web page development characteristics or a corresponding one of the additional characteristics.

5. A method comprising:
receiving, by a custom web page development server having a processor, from a requesting mobile device, an incoming request for a web page;
determining, by the custom web page development server, based on a device type of the requesting mobile device, whether the requesting mobile device belongs to one of a plurality of groups, wherein the plurality of groups are stored in an information store, and wherein each of the plurality of groups is associated with corresponding custom web page development characteristics for constructing custom web pages suited for corresponding qualifications defined for each of the plurality of groups;
obtaining, by the custom web page development server, in response to determining that the requesting mobile device does not belong to one of the plurality of groups, default web page development characteristics from a default group for constructing a custom web page for the requesting mobile device
identifying, by the custom web page development server, additional characteristics for constructing the custom web page based on a type of a wireless network through which the requesting mobile device is requesting the web page, a location associated with the requesting mobile device when the incoming request for the web page is received, a time of day when the incoming request for the web page is received, and a trigger associated with a preset limit of data usage for a user of the requesting mobile device;
selecting, by the custom web page development server, web page components based on the default web page development characteristics and the additional characteristics; and
constructing, by the custom web page development server, the custom web page for the requesting mobile device based on the web page components.

6. The method of claim 5, wherein the default web page development characteristics of the default group are associated with levels of web page development characteristics that increase a likelihood that the custom web page to be generated will be tailored for the requesting mobile device that does not belong to one of the plurality of groups.

7. The method of claim 5, wherein the additional characteristics for constructing the custom web page based on the type of the wireless network through which the requesting mobile device is requesting the web page, the location associated with the requesting mobile device when the incoming request for the web page is received, the time of day when the incoming request for the web page is received, and the trigger associated with the preset limit of data usage for the user of the requesting mobile device are set forth in rules provided by at least one of an operator of the custom web page development server, a communications service provider, or the user of the requesting mobile device.

8. The method of claim 5, wherein the custom web page development server is in communication with:

the information store including the plurality of groups and the default group, and a custom web page development database including the web page components, each of the web page components associated with a corresponding one of the default web page development characteristics or a corresponding one of the additional characteristics.

9. A computer-readable storage device comprising computer-executable instructions that, when executed by a processor of a web page development system, cause the processor to perform operations comprising:

receiving, from a requesting mobile device, an incoming request for a web page;

determining, based on a device type of the requesting mobile device, whether the requesting mobile device belongs to one of a plurality of groups, wherein the plurality of groups are stored in an information store, and wherein each of the plurality of groups is associated with corresponding custom web page development characteristics for constructing custom web pages suited for corresponding qualifications defined for each of the plurality of groups;

obtaining, in response to determining that the requesting mobile device does not belong to one of the plurality of groups, default web page development characteristics from a default group for constructing a custom web page for the requesting mobile device identifying additional characteristics for constructing the custom web page based on a type of a wireless network through which the requesting mobile device is requesting the web page, a location associated with the requesting mobile device when the incoming request for the web page is received, a time of day when the incoming request for the web page is received, and a trigger associated with a preset limit of data usage for a user of the requesting mobile device;

selecting web page components based on the default web page development characteristics and the additional characteristics; and constructing the custom web page for the requesting mobile device based on the web page components.

10. The computer-readable storage device of claim 9, wherein the default web page development characteristics of the default group are associated with levels of web page development characteristics that increase a likelihood that the custom web page to be generated will be tailored for the requesting mobile device that does not belong to one of the plurality of groups.

11. The computer-readable storage device of claim 9, wherein the additional characteristics for constructing the custom web page based on the type of the wireless network through which the requesting mobile device is requesting the web page, the location associated with the requesting mobile device when the incoming request for the web page is received, the time of day when the incoming request for the web page is received, and the trigger associated with the preset limit of data usage for the user of the requesting mobile device are set forth in rules provided by at least one of an operator of the web page development system, a communications service provider, or the user of the requesting mobile device.

12. The computer-readable storage device of claim 9, wherein the processor is in communication with:

the information store including the plurality of groups and the default group; and a custom web page development database including the web page components, each of the web page components associated with a corresponding one of the default web page development characteristics or a corresponding one of the additional characteristics.

\* \* \* \* \*